(12) United States Patent
Belle et al.

(10) Patent No.: US 11,827,218 B2
(45) Date of Patent: Nov. 28, 2023

(54) CONTROL OF THE SPEED OF A VEHICLE WHEN CORNERING IN ACCORDANCE WITH THE SPEED SETPOINT

(71) Applicant: PSA AUTOMOBILES SA, Poissy (FR)

(72) Inventors: Claire Belle, Seloncourt (FR); Fabrice Perrot, Igny (FR)

(73) Assignee: PSA AUTOMOBILES SA, Poissy (FR)

( * ) Notice: Subject to any disclaimer, the term of this patent is extended or adjusted under 35 U.S.C. 154(b) by 282 days.

(21) Appl. No.: 17/291,933

(22) PCT Filed: Oct. 25, 2019

(86) PCT No.: PCT/FR2019/052548
§ 371 (c)(1),
(2) Date: May 6, 2021

(87) PCT Pub. No.: WO2020/104738
PCT Pub. Date: May 28, 2020

(65) Prior Publication Data
US 2022/0009487 A1    Jan. 13, 2022

(30) Foreign Application Priority Data
Nov. 23, 2018 (FR) ...................................... 1871747

(51) Int. Cl.
*B60W 30/14* (2006.01)
(52) U.S. Cl.
CPC ..... *B60W 30/146* (2013.01); *B60W 2520/125* (2013.01); *B60W 2552/30* (2020.02); *B60W 2720/10* (2013.01); *B60W 2720/12* (2013.01)
(58) Field of Classification Search
CPC ......... B60W 30/146; B60W 2520/125; B60W 2552/30; B60W 2720/10; B60W 2720/12;
(Continued)

(56) References Cited

U.S. PATENT DOCUMENTS 6,081,761 A *  6/2000  Harada .................... B60T 8/327
                                                    701/72
8,712,663 B1 *  4/2014  Zeng ................... B60W 10/184
                                                    701/93
(Continued)

FOREIGN PATENT DOCUMENTS

DE     10 2012 011171 A1    12/2013
DE     10 2016 215046 A1     2/2018
(Continued)

OTHER PUBLICATIONS

WO-2008141859-A2 Translation (Year: 2008).*
KR-20160059797-A Translation (Year: 2016).*

*Primary Examiner* — Jeff A Burke
*Assistant Examiner* — Kyle T Johnson
(74) *Attorney, Agent, or Firm* — Sandberg Phoenix & von Gontard, PC

(57) ABSTRACT

Disclosed is a method intended to regulate the speed of a vehicle with at least partially automated driving and knowing the radius of curvature of a future segment which it is about to take on its route. This method comprises a step (10-90) which involves regulating the speed of the vehicle in accordance with a speed setpoint and, in the event that a radius of curvature of the future segment representative of a bend is detected, determining a maximum transverse acceleration that the vehicle can undergo in the bend depending on the speed setpoint, then a maximum speed that the vehicle would have in the bend if it underwent this maximum transverse acceleration in the presence of the detected radius of curvature, then imposing a deceleration phase on the vehicle until a deceleration speed chosen as a function of this determined maximum speed is reached.

14 Claims, 3 Drawing Sheets

(58) Field of Classification Search
CPC ..... B60W 2050/0026; B60W 2520/10; B60W 2540/30; B60W 2556/50; B60W 2720/125; B60W 30/143
See application file for complete search history.

(56) References Cited

U.S. PATENT DOCUMENTS

| | | |
|---|---|---|
| 2007/0050127 A1 | 3/2007 | Kellum et al. |
| 2007/0106445 A1* | 5/2007 | Suzuki ................. B60T 8/1755 701/79 |
| 2008/0059037 A1* | 3/2008 | Isaji .................... B60W 40/072 701/93 |
| 2014/0309837 A1* | 10/2014 | Ham ............... B60W 30/18145 701/25 |
| 2016/0304093 A1 | 10/2016 | Maier |
| 2018/0186373 A1 | 7/2018 | Lieu et al. |
| 2018/0345953 A1* | 12/2018 | Mizoguchi .......... B60W 30/045 |
| 2018/0364709 A1* | 12/2018 | Choi .................... G05D 1/0061 |
| 2019/0031191 A1* | 1/2019 | Satoh ............... B60W 30/18145 |
| 2020/0010085 A1* | 1/2020 | Ohmura ............ B60W 60/0059 |
| 2020/0189586 A1* | 6/2020 | Choi ............. B60W 30/18145 |
| 2021/0039679 A1* | 2/2021 | Chae .................. B60W 30/182 |
| 2021/0300364 A1* | 9/2021 | Sadamura .......... B60W 40/072 |
| 2022/0009487 A1* | 1/2022 | Belle .................. B60W 30/146 |
| 2022/0041161 A1* | 2/2022 | Belle .................. B60W 30/146 |

FOREIGN PATENT DOCUMENTS

| | | | | |
|---|---|---|---|---|
| EP | 2853457 A1 | | 4/2015 | |
| KR | 20160059797 A | * | 5/2016 | |
| WO | WO-2008141859 A2 | * | 11/2008 | ............ B60W 10/06 |
| WO | WO-2021053474 A1 | * | 3/2021 | |

\* cited by examiner

[Fig. 1]
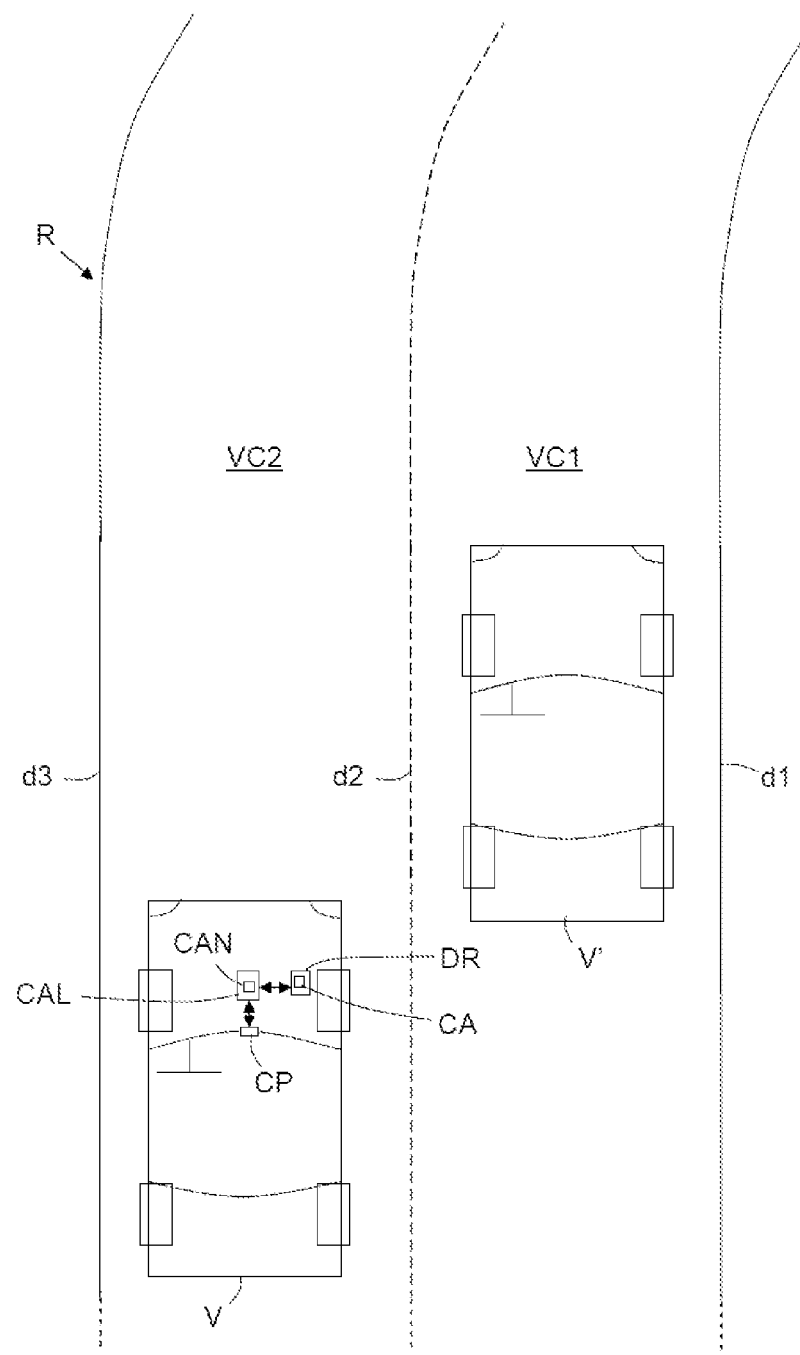

[Fig. 2]
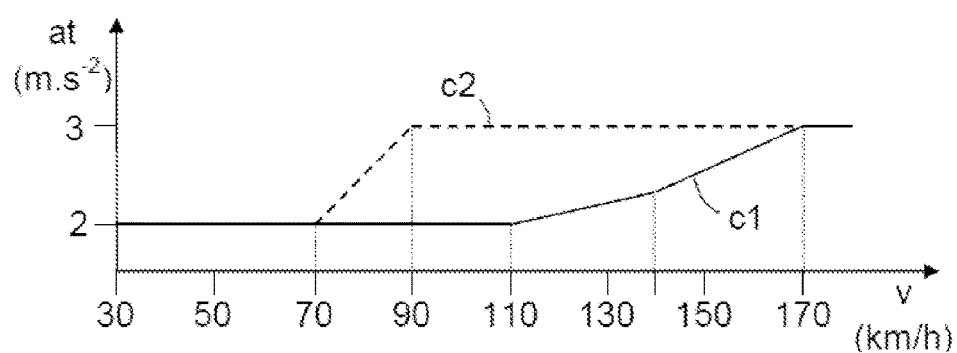

[Fig. 3]
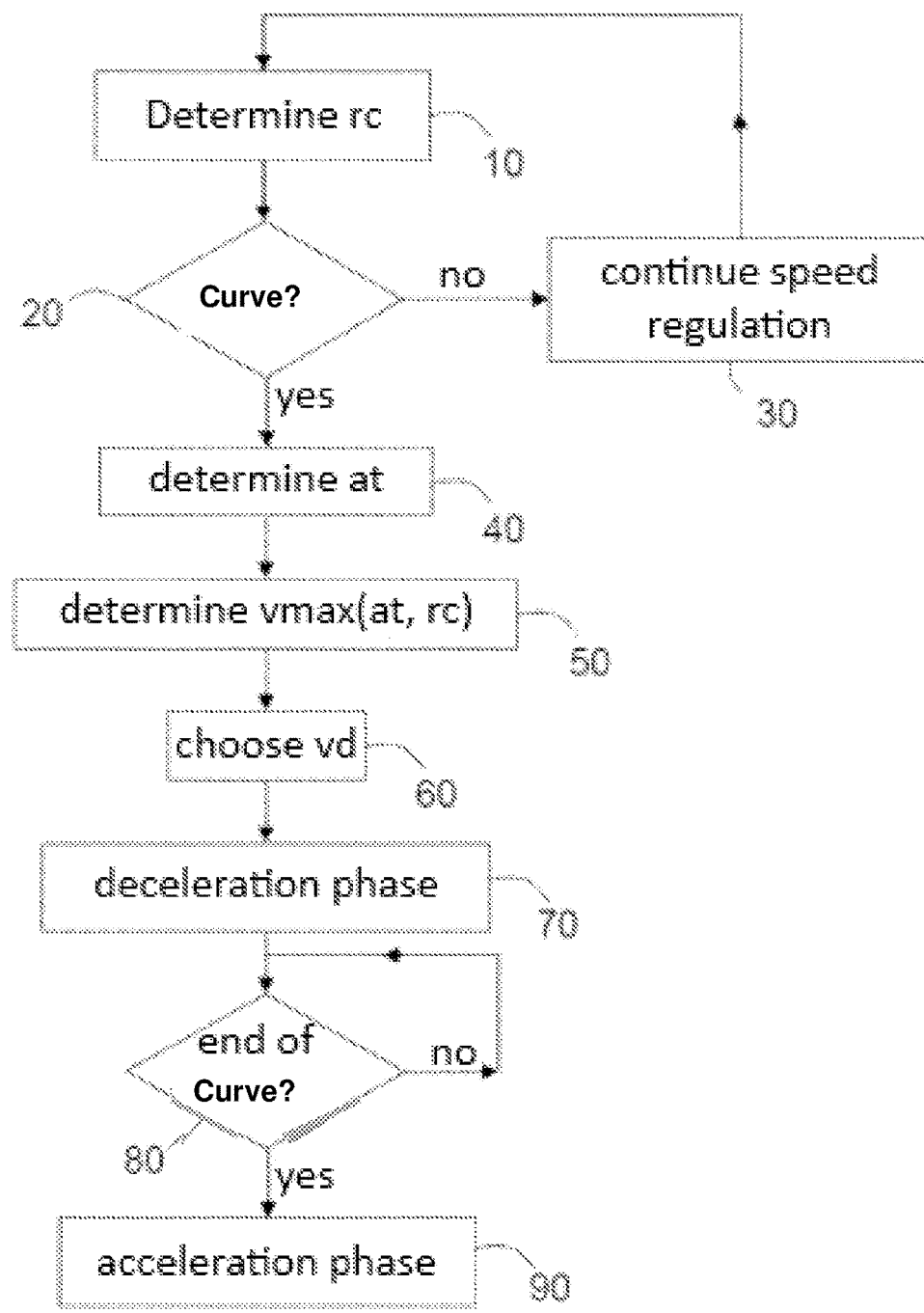

CONTROL OF THE SPEED OF A VEHICLE WHEN CORNERING IN ACCORDANCE WITH THE SPEED SETPOINT

CROSS-REFERENCE TO RELATED APPLICATIONS

This application is the US National Stage under 35 USC § 371 of International Application No. PCT/FR2019/052548, filed 25 Oct. 2019 which claims priority to French Application No. 1871747 filed 23 Nov. 2018, both of which are incorporated herein by reference.

TECHNICAL FIELD OF THE INVENTION

The invention relates to at least partially self-driving vehicles, and more precisely to the regulation of the speed of such vehicles.

In what follows, a vehicle is considered to be at least partially self-driving (or autonomous) when it can be driven in a (partially or totally) automated manner (without intervention of the driver) during a self-driving phase, or manually (and therefore with intervention by the driver on the steering wheel and/or the pedals) during a manual driving phase.

STATE OF THE ART

Certain, at least partially, self-driving (or autonomous) vehicles comprise a regulation device responsible for controlling their speed as a function of a speed setpoint, optionally chosen by their driver. Some of these regulation devices comprise an option making it possible to adapt the speed of their vehicle as a function of the radius of curvature of the future segment of road which the vehicle is about to take in the traffic lane along which it is traveling.

This type of regulation device comprises at least one computer which, if a radius of curvature of the adopted future segment is detected which is representative of a bend, controls the imposition of a deceleration phase on its vehicle down to a chosen deceleration speed (or speed for passing in a curve), followed by an acceleration phase until a speed is obtained which is equal to the speed setpoint. The acceleration in the acceleration phase depends on the radius of curvature of the segment of road in front of the vehicle. It can therefore be limited or not. In the latter case, it is the vehicle speed regulation device which provides control to reach the setpoint speed. In other words, if an upcoming curve is detected, the speed of the vehicle is temporarily reduced in order to facilitate its passage through this curve and thus to improve passenger comfort.

Currently, when the driver of the vehicle imposes an acceleration on the vehicle during the deceleration phase, for example because he is passing another vehicle, the computer temporarily interrupts this deceleration phase, and when the driver of the vehicle stops imposing an acceleration, the computer once again begins to control the imposition of the interrupted deceleration phase, which will then be followed by the aforementioned acceleration phase. Such an operating mode does not incorporate the driver's wishes, namely the desire not to see the speed of his vehicle drop to the speed chosen at the end of the deceleration phase, for example due to the fact that he wishes to continue passing in a curve. In addition, this operating mode may cause a slowing down of the flow of traffic which may appear incomprehensible to at least one of the drivers of the vehicles following the sloweddown vehicle, or even may prove dangerous if one of the latter drivers does not notice the slowdown, in particular when the slowdown is too small to generate its signal. In addition, if the speed of the vehicle concerned is very slightly higher than that of vehicles traveling in the right lane (in the case of driving on the left), slowing down the vehicle concerned may make its speed lower than that of vehicles traveling in the right lane. This may then result in the vehicle in question being overtaken by a vehicle traveling in the right-hand lane, which is prohibited by the highway code.

It has been proposed to choose the speed of deceleration (or of passing in a curve) of a deceleration phase in progress as a function of the speed setpoint in progress. Thus, the driver who so wishes can manually reduce or increase the speed setpoint in order to induce a reduction or an increase in the value of the deceleration speed. However, such an option requires manual intervention by the driver on the control member associated with the speed regulation function. Also, it requires the driver to know if the turn is tight, very tight, or extreme, which is not always the case. In addition, this option then forces the driver to think about again modifying the speed setpoint that he has just modified after passing the curve, because the latter can now cause a slowdown in traffic or be (notably) above a speed limit that is imposed on the segment of the traffic lane he is using.

BRIEF SUMMARY

The object of the invention is, in particular, to improve this situation.

For this purpose, disclosed is a method intended to regulate the speed of an at least partially self-driving vehicle, knowing the radius of curvature of a future segment the vehicle is about to take in a traffic lane along which it is traveling, and comprising a step in which the speed of the vehicle is regulated as a function of a speed setpoint and, if a radius of curvature of the future position representative of a bend is detected, a phase of deceleration down to a chosen speed of deceleration (or passing in a curve) is imposed on the vehicle.

This method is characterized in that in its step:
- a maximum transverse acceleration that the vehicle can undergo in the curve is determined as a function of the speed setpoint, then
- a maximum speed is determined that the vehicle would have in this curve if it underwent this maximum transverse acceleration in the presence of the detected radius of curvature, then
- a deceleration speed is chosen as a function of this determined maximum speed.

Thus, by the method it is now possible to automatically adapt the speed of deceleration (or passing) of the vehicle in a curve as a function of the speed setpoint and the radius of curvature of this curve, in order to anticipate the oftenobserved desire of the driver to have a difference between its setpoint speed and the deceleration speed that is (relatively) smaller as the setpoint speed is high.

The method may comprise other features that may be included separately or in combination, and in particular:
- in its step, it is possible to determine the maximum transverse acceleration that the vehicle can undergo in the curve as a function of the speed setpoint and of a maximum speed reduction authorized as a function of a current local context;
- in its step, it is possible to determine the maximum transverse acceleration that the vehicle can undergo in the curve as a function of a speed interval to which the speed setpoint belongs and which is chosen from at least two chosen speed intervals;

in its step, the speed intervals can be chosen as a function of the current local context;

in its step, the deceleration speed can be chosen as a function of the determined maximum speed and of the maximum authorized speed reduction;

in its step, the maximum authorized speed reduction can be a function of a speed difference between an authorized speed limit in the traffic lane used by the vehicle and the speed setpoint;

in its step, the greater the speed difference is, the greater the maximum authorized speed reduction can be.

A computer program product is also proposed comprising a set of instructions which, when it is executed by processing means, is suitable for implementing a speed regulation method of the type presented above to regulate the speed of an at least partially self-driving vehicle and knowing the radius of curvature of a future segment which the vehicle is about to take in a traffic lane along which it is traveling.

A speed regulation device is also proposed which, on the one hand, is intended to equip an at least partially self-driving vehicle and knowing the radius of curvature of a future segment which it is about to take in a traffic lane along which it is traveling, and, on the other hand, comprises at least one computer controlling the regulation of the speed of the vehicle as a function of a speed setpoint, and, if a radius of curvature of the future position representative of a bend is detected, controlling the imposition on the vehicle of a deceleration phase down to a chosen speed of deceleration (or passing in a curve).

This speed regulation device is characterized by the fact that its computer determines a maximum transverse acceleration that the vehicle can undergo in the curve as a function of the speed setpoint, then determines a maximum speed that the vehicle would have in this curve if it underwent this maximum transverse acceleration in the presence of the detected radius of curvature, then chooses a deceleration speed as a function of this determined maximum speed.

Lastly, a vehicle, possibly of the automobile type, is proposed which is at least partially self-driving, knowing the radius of curvature of a future segment which it is about to take in a traffic lane along which it is traveling, and comprising a speed regulation device of the type presented above.

BRIEF DESCRIPTION OF THE FIGURES

Other features and advantages of the invention will appear on examining the detailed description below, and the attached drawings, in which:

FIG. 1 schematically and functionally illustrates a vehicle located on one of the two traffic lanes of a road which is equipped with a sensor, analysis circuits and an embodiment of a speed regulation device, and FIG. 2 schematically illustrates, within a diagram, first (c1) and second (c2) curves of evolution of the transverse acceleration (at) authorized as a function of the speed (v) of a vehicle subject to speed regulation with deceleration in a curve, in the presence of low and high traffic, respectively, and FIG. 3 schematically illustrates an example of an algorithm implementing a speed regulation method.

DETAILED DESCRIPTION

The object of the invention is in particular to propose a speed regulation method, and an associated speed regulation device DR, intended to allow the speed regulation of an at least partially self-driving (autonomous) vehicle V, especially in the presence of a curve.

In the following, and by way of a non-limiting example, the vehicle V is considered to be of the automobile type. This is for example a car, as illustrated in FIG. 1. However, the method and speed regulation device are not limited to this type of vehicle. Indeed, it concerns any type of at least partially self-driving terrestrial vehicle that can travel in terrestrial traffic lanes.

FIG. 1 schematically and functionally shows a road R comprising first VC1 and second VC2 traffic lanes along which two vehicles V' and V, respectively, travel. The first traffic lane VC1 is framed (or delimited) by two demarcations d1 and d2, and the second traffic lane VC2 is framed (or delimited) by two demarcations d2 and d3. Furthermore, in this FIG. 1, the vehicle V' is traveling along the first traffic lane VC1, while the vehicle V is traveling along the second traffic lane VC2 in order to overtake (or pass) the vehicle V'.

The vehicle V comprises at least one speed regulation device DR. In the example illustrated without limitation in FIG. 1, the vehicle V also optionally comprises a sensor CP and analysis circuits CAN to which we will return later.

It will be noted that for the method to be able to be implemented, the vehicle V must know at all times the radii of curvature rc of the position of the second traffic lane VC2 on which it is traveling and of the future segment which it is about to take on this second traffic lane VC2 along which it is traveling. This knowledge can result from an analysis of the environment, or from road information defining each segment of the road R taken (and in particular its radius of curvature rc (or its inverse, namely the curvature)), or from an analysis of the coordinates (for example GPS) of the road R.

The analysis of the environment can, for example, result from the (permanent) presence in the vehicle V of at least one sensor CP and of analysis circuits CAN, as illustrated non-limitingly in FIG. 1.

This sensor CP comprises at least one digital camera installed in a front part of the vehicle (for example on the windshield or on the interior rearview mirror), and which is responsible for acquiring digital images of the environment which is at least located in front of the vehicle V (as well as possibly on part of the two lateral sides of the latter (V)).

Note that the number of sensors CP here is equal to one (1), but it can take any value greater than or equal to one (1) (at least one sensor on the front), as long as this makes it possible to acquire data of the environment which is at least in front of the vehicle V. Thus, the vehicle V could also comprise at least one ultrasonic sensor, or at least one radar or lidar, or even at least one other camera installed in a rear part and/or cameras installed on its two lateral sides.

The analysis circuits CAN are arranged so as to analyze at least the digital images acquired by the sensor CP in the environment situated at least in front of the vehicle V, in order to determine data which are representative at least of the second traffic lane VC2 along which the vehicle V travels temporarily. For example, these environmental data define at least the radius of curvature rc (or the curvature) of the segments of the two demarcations d2 and d3 of the second traffic lane VC2 that the vehicle V is preparing to traverse. It will be noted that these environmental data can also define the heading of the vehicle V, and/or the estimate of the derivative of the radius of curvature rc, and/or the width of a demarcation, and/or the distance separating two demarcations (here d2 and d3), for example.

In the example illustrated non-limitingly in FIG. 1, the analysis circuits CAN form part of a computer CAL on board the vehicle V. However, this is not mandatory. Indeed, the analysis circuits CAN could comprise their own computer. Consequently, the analysis circuits CAN can be produced in the form of a combination of electrical or electronic circuits or components (or "hardware") and software (or computer) modules.

The road information (defining each segment of the road R taken) can come from a database defining a very precise road map, on board the vehicle V or else accessible via electromagnetic, or air, waves by the vehicle V. In this case, the geographical position of the future segment which the vehicle V is about to take along the second traffic lane VC2 is precisely determined, for example by means of an on-board navigation assistance device (possibly temporarily) in the vehicle V, then the radius of curvature rc (or the curvature) which is associated with this future position is determined in the database.

In the absence of a sensor CP but in the presence of coordinates (for example GPS) of the road R, the analysis circuits CAN are arranged so as to analyze these coordinates in order to determine the environmental data which define at least the radius of curvature (or the curvature) of the segments of the two demarcations d2 and d3 of the second traffic lane VC2 that the vehicle V is about to take. These coordinates of the road R can, for example, be provided by a navigation assistance device on board (possibly temporarily) in the vehicle V.

Once the radius of curvature (or curvature) is known, it is possible to determine the comfort speed in order to comfortably traverse the upcoming curve segment.

As mentioned above, a speed regulation method is proposed which is intended to allow the automated regulation of the speed of the vehicle V.

This method (of speed regulation) can be at least partially implemented by the (speed) regulation device DR, which for this purpose comprises at least one computer CA. The computer CA can, for example, comprise at least one digital signal processor (or DSP), optionally associated with at least one memory.

It will be noted that this regulation device DR is possibly of the ADAS ("Advanced Driver Assistance System") type. Thus, it may for example be of the so-called ACC ("Adaptive Cruise Control") type.

It will also be noted that the computer CA can optionally perform at least one function within the vehicle V other than that which is the subject of the method. Thus, it could for example comprise any analysis circuits CAN.

The method comprises a step 10-90 which begins when the driver of the vehicle V has activated the speed regulation function and a speed setpoint cv has been chosen.

It will be noted that the speed setpoint cv can be chosen either by the driver of the vehicle V, or by a device on board the vehicle V, for example as a function of a speed limit imposed on the segment of the road R taken.

This regulation of speed is controlled by the computer CA by means of commands which the computer determines for components of the vehicle V which are involved in the movements of the vehicle V, such as for example the powertrain (or GMP), the braking system, and the gear changing means (for example an automatic gearbox).

Then, during this step 10-90, if a radius of curvature rc of the future segment (which the vehicle V is preparing to take along the second traffic lane VC2) representative of a bend is detected, a maximum transverse acceleration at which the vehicle V can undergo in this curve is determined as a function of the speed setpoint cv (possibly adapted as a function of the speed of another vehicle situated in front of the vehicle V).

It is important to note that in above and hereinafter, "curve" is understood to mean a segment of road whose radius of curvature rc requires a reduction in speed in order to comply with a comfortable speed.

It will be understood that it is the computer CA which detects whether the radius of curvature rc of the future segment is representative of a bend (and therefore if it will require a reduction in speed), then which determines the maximum transverse acceleration at.

Then, step 10-90 continues with the determination of the maximum speed vmax(at, rc) that the vehicle V would have in the curve if it underwent the maximum transverse acceleration at in the presence of the detected radius of curvature rc (and therefore the associated comfort speed). Then, step 10-90 continues with the choice of a speed of deceleration (or passing in a curve) vd, which the vehicle V must have at the end of an imminent deceleration phase, depending on this determined maximum speed vmax(at, rc). Then, this deceleration phase is imposed on the vehicle V to reduce the speed of the vehicle V down to the chosen speed of deceleration (or passing in a curve) vd. The duration of the deceleration phase and the speed of deceleration (or of passing in a curve) vd (which is a maximum permitted speed) are chosen so as to respect longitudinal comfort.

In other words, the maximum speed vmax(at, rc) at which the vehicle V can take the curve is determined, taking into account the radius of curvature rc and the speed setpoint cv (possibly adapted). If this maximum speed vmax(at, rc) is less than the current speed of the vehicle V, it is possible, for example, to determine at what moment (start of the deceleration phase) the vehicle V must begin to slow down in order to comply with all the maximum speed points ahead in the considered turn. After the deceleration phase, either the speed is limited further, or this limitation is stopped as indicated below.

It is the computer CA which determines the maximum speed vmax(at, rc) and the speed of deceleration (or passing in a curve) vd, and which controls the imposition of the deceleration phase on the vehicle V.

With this method, it is now advantageously possible to automatically adapt the deceleration speed vd of a vehicle V in a curve as a function of the speed setpoint cv and the radius of curvature rc of this curve. It has in fact been observed that the more a driver sets the speed setpoint cv at a high value, the more he wanted the difference between his speed setpoint cv and the deceleration speed vd in a curve to be small (at least relatively), including when this caused a strong increase in transverse acceleration at.

Once the deceleration speed vd has been reached by the vehicle V, an acceleration phase is imposed on the vehicle V until a speed equal to the speed setpoint cv is obtained (possibly adapted according to the speed of another vehicle located in front of the vehicle V). It is in fact considered that the curve no longer imposes a constraint on the speed of the vehicle V. It will be understood that it is the computer CA which controls the imposition of the acceleration phase on the vehicle V. This acceleration phase can be imposed just after the deceleration phase, or after allowing a predefined time to pass at the end of the deceleration phase, or even when the radius of curvature rc of the future segment which the vehicle V is about to take becomes high enough not to require a new deceleration phase.

For example, in step 10-90 the computer CA can determine the maximum transverse acceleration at that the vehicle V can undergo in the curve as a function not only of the speed setpoint cv (possibly adapted), but also a maximum reduction in speed rm authorized as a function of a current local context in the traffic lane VC2 which is used by its vehicle V. Indeed, when the local context requires it, it is possible to decide to temporarily use a smaller maximum reduction in speed rm, even though we know that this will induce a maximum transverse acceleration at in the vehicle V which is greater than usual (and therefore possibly less comfortable for the passengers of vehicle V).

Any type of local context can be considered here as long as it concerns traffic on the road R. Thus, the local context can be a vehicle V' being overtaken by the vehicle V (as illustrated in FIG. 1), or the traffic density (high, low or medium). It will in fact be understood that when overtaking, it is preferable for the vehicle V to be placed in front of the vehicle V' as quickly as possible so as not to prevent other vehicles from doing the same and not to disturb the driver of the vehicle V'. Likewise, the higher the traffic density, the more it is necessary to respect the current speed of the traffic flow (here in the second traffic lane VC2), in order to avoid accidents or generating slowdowns.

Any local context is preferably detected automatically by the computer CA, for example by analyzing environmental images acquired by a sensor CP and/or local road information received by the vehicle V. However, it could also be provided by the driver via a man/machine interface of the vehicle V.

It will be noted that in step 10-90, it is possible to determine the maximum transverse acceleration at which the vehicle V can undergo in the curve considered as a function of the speed interval to which the speed setpoint cv belongs and which is chosen from among at least two selected speed intervals. This option can be implemented with or without taking into account a possible local context.

In the presence of the last two options, in step 10-90 the speed intervals can be chosen (by the computer CA) according to the current local context.

The implementation of the last three options is schematically illustrated by way of example in FIG. 2, within a diagram. More precisely, this diagram illustrates the first c1 and second c2 curves of temporal evolution (t) of the transverse acceleration at (in $m \cdot s^{-2}$) authorized for the vehicle V as a function of its speed v (in km/h) when it is subject to speed regulation by its regulation device DR and in the presence of low and high traffic, respectively. Curve c1 illustrates a so-called comfort situation in which the transverse comfort of the passengers is favored, while curve c2 illustrates a so-called degraded situation in which "efficiency" is sought so as not to disturb the flow of traffic.

In this purely illustrative example, curve c1 (comfort) shows that it is accepted that the authorized transverse acceleration at is equal to 2 $m \cdot s^{-2}$ as long as the speed setpoint cv remains less than or equal to 110 km/h, then that the authorized transverse acceleration at is between 2.01 $m \cdot s^{-2}$ and 2.5 $m \cdot s^{-2}$ when the speed setpoint cv is between 111 km/h and 140 km/h, then that the authorized transverse acceleration at is between 2.51 $m \cdot s^{-2}$ and 3 $m \cdot s^{-2}$ when the speed setpoint cv is between 141 km/h and 170 km/h, and finally that the authorized transverse acceleration at is equal to 3 $m \cdot s^{-2}$ as long as the speed setpoint cv remains above 171 km/h. Curve c2 (efficiency) shows that it is accepted that the authorized transverse acceleration at is equal to 2 $m \cdot s^{-2}$ as long as the speed setpoint cv remains less than or equal to 70 km/h, then that the authorized transverse acceleration at is between 2.01 $m \cdot s^{-2}$ and 3 $m \cdot s^{-2}$ when the speed setpoint cv is between 71 km/h and 90 km/h, then that the authorized transverse acceleration at is equal to 3 $m \cdot s^{-2}$ as long as the speed setpoint cv remains above 91 km/h.

The two lateral acceleration curves C1 and C2 do not depend here on the traffic or the density of the latter, but simply on the speed difference that is authorized so as not to reduce the speed of the vehicle V too much and thus not be too out of step with the driver's choice. Moreover, it will be noted that in certain contexts it is possible to be between the two curves C1 and C2.

It emerges from the description of FIG. 2 above that the speed intervals chosen by the computer CA vary depending on whether one is in the first local context corresponding to the comfort curve c1, or in the second local context corresponding to the degraded curve c2. In addition, it can be observed that the maximum transverse acceleration at depends on one of the four speed intervals to which the speed setpoint vc considered in the first local context corresponding to the comfort curve c1 belongs, and on one of the three speed intervals to which the speed reference cv considered in the second local context corresponding to the degraded curve c2 belongs. The number of speed intervals used for each local context considered may vary depending on the configuration of the computer CA or the needs. Each speed interval can, for example, be associated with a driver profile (and more precisely with the difference that the driver is accustomed to choosing between the speed setpoint cv and the speed limit authorized on the segment of the road R which he takes). As a variant, the setpoint speeds taking into account the curves to be passed can determine the profiles of the drivers.

It will also be noted that in step 10-90, the computer CA can choose the deceleration speed vd as a function of the determined maximum speed vmax(at, rc) and the maximum reduction in speed rm which is authorized as a function of the current local context. This preferably requires that the local context corresponds to the radius of curvature rc and to the speed setpoint cv, and not to the density of the traffic.

In other words, this option makes it possible to prevent the speed difference between the speed setpoint cv and the deceleration speed vd from being greater than a value equal to the maximum reduction in speed rm.

It will also be noted that in step 10-90, the maximum authorized speed reduction rm can be a function of the speed difference ev between the authorized speed limit in the traffic lane VC2 used by the vehicle V and the speed setpoint cv. For example, in the presence of the latter option, in step 10-90, the greater the speed difference ev is, the greater the maximum authorized speed reduction rm can be.

However, in a variant of the latter option, the maximum authorized speed reduction rm can be predefined. In this case, it may for example depend on the speed interval to which the considered (and possibly adapted) speed setpoint cv belongs. Two maximum authorized differences could also be taken into consideration: the first allowing the speed difference to be limited while respecting the comfort speed curve and then authorizing a degradation of the comfort so as not to reduce the speed of the vehicle V too much, the second making it possible to freeze a degraded maximum lateral (or transverse) acceleration and to authorize a reduction in maximum speed (for example of 60 km/h) compared to the speed setpoint cv. In this case, it is considered that the driver must manage the situation if his speed setpoint differs far too much from what the road configuration allows.

It will also be noted that the speed limit in force on the segment of the road taken can be taken into account in the calculations here.

An example of an algorithm implementing the step of the speed regulation method described above is schematically illustrated in FIG. 3.

In a first sub-step 10, the computer CA determines, while it is regulating the speed of the vehicle V to the speed setpoint cv (possibly adapted), the radius of curvature rc of the future segment (which the vehicle V is preparing to adopt along the second traffic lane VC2).

Then, in a second sub-step 20, the computer CA determines whether this radius of curvature rc is representative of a bend. If not ("no"), the computer CA normally continues the speed regulation at the speed setpoint cv in a third sub-step 30 and carries out the first sub-step 10 again.

Conversely, in the affirmative ("yes"), in a fourth sub-step 40, the computer CA determines a maximum transverse acceleration at which the vehicle V can undergo in the curve as a function of the speed setpoint cv (possibly adapted).

Then, in a fifth sub-step 50, the computer CA determines the maximum speed vmax(at, rc) that the vehicle V would have in the curve if it were subjected to the maximum transverse acceleration at determined in the fourth sub-step 40, in the presence of the radius of curvature rc detected in the first sub-step 10.

Then, in a sixth sub-step 60, the computer CA chooses a deceleration speed vd, which the vehicle V must have at the end of the upcoming deceleration phase, as a function of the maximum speed vmax(at, rc) determined in the fifth sub-step 50.

Then, in a seventh sub-step 70, the computer CA imposes a deceleration phase on the vehicle V down to the deceleration speed vd chosen in the sixth sub-step 60.

Then, in an eighth sub-step 80, the computer CA can, for example, determine whether vehicle V has exited the curve. If not ("no"), the computer CA can carry out the eighth sub-step 80 again.

Conversely, in the affirmative ("yes"), in a ninth sub-step 90, the computer CA may impose an acceleration phase on the vehicle V until a speed equal to the speed setpoint cv (possibly adapted) is obtained. Then, the computer CA will resume normal speed regulation (excluding curves), at the speed setpoint cv (possibly adapted), and therefore the computer CA will carry out the first sub-step 10 again.

It will be noted that a computer program product is also proposed comprising a set of instructions which, when it is executed by processing means of the electronic circuit (or hardware) type, such as for example the computer CA, is capable of implementing the speed regulation method described above in order to regulate the speed of the vehicle V.

It will also be noted that in FIG. 1, the regulation device DR is very schematically illustrated with only its computer CA. This regulation device DR can take the form of a box comprising integrated (or printed) circuits, or of several integrated (or printed) circuits connected by wired or non-wired connections. An integrated (or printed) circuit is understood to mean any type of device capable of performing at least one electrical or electronic operation. As mentioned above, this regulation device DR can comprise at least one processor, for example a digital signal processor (or DSP), a random access memory for storing instructions for the implementation by this processor of the speed regulation method as described above, and auxiliary storage in particular for storing the environmental data obtained, and any intermediate data involved in all the calculations. The computer CA receives at least the environmental data for use in calculations, possibly after having shaped and/or demodulated and/or amplified them, in a manner known per se. The regulation device DR can also comprise an input interface for receiving at least the environmental data, and an output interface for the transmission of the results of its calculations, and in particular the speed regulation commands.

One or more sub-steps of the speed regulation method step can be performed by different components. Thus, the speed regulation method can be implemented by a plurality of processors, random access memory, auxiliary storage, input interface, output interface and/or digital signal processor. In these situations, the regulation device DR can be decentralized, within a local network (several processors linked together for example) or a wide area network.

The invention claimed is:

1. A method of regulating the speed of an at least partially self-driving vehicle, knowing the radius of curvature of a future position the vehicle is preparing to adopt in a traffic lane along which the vehicle is traveling, said method comprising:
regulating the speed of said vehicle as a function of a speed setpoint, and,
if a radius of curvature of said future position representative of a curve is detected, imposing a phase of deceleration on said vehicle by a controller to reduce down to a chosen deceleration speed, said step of imposing a phase of deceleration on said vehicle comprising:
electronically determining a maximum transverse acceleration that said vehicle can undergo in said curve as a function of said speed setpoint,
then electronically determining a maximum speed that said vehicle would have in said curve if it underwent said maximum transverse acceleration in the presence of said detected radius of curvature,
then electrically choose a deceleration speed as a function of this determined maximum speed,
wherein said maximum transverse acceleration that may be experienced by said vehicle in said curve is determined as a function of said speed setpoint and of a maximum reduction in speed authorized as a function of a current local traffic context in said traffic lane taken by said vehicle.

2. The method according to claim 1, wherein, said deceleration speed is chosen as a function of said determined maximum speed and of said maximum authorized speed reduction.

3. The method according to claim 1, wherein, said maximum authorized speed reduction is a function of a speed difference between an authorized speed limit in said traffic lane used by said vehicle and said speed setpoint.

4. The method according to claim 3, wherein, the greater said speed difference is, the greater said maximum authorized speed reduction is.

5. A computer program product comprising a set of instructions which, when executed by a processing means, is suitable for implementing the speed regulation method according to claim 1 to regulate the speed of said vehicle and knowing the radius of curvature of a future position that it is preparing to adopt in a traffic lane along which it is traveling.

6. A speed regulation device for an at least partially self-driving vehicle, knowing the radius of curvature of a future position it is preparing to adopt in a traffic lane along which it is traveling, said device comprising at least one computer controlling the regulation of the speed of said vehicle as a function of a speed setpoint and, if a radius of curvature of said future position representative of a curve is detected, controlling the imposition on said vehicle of a deceleration phase down to a chosen deceleration speed, wherein said computer is adapted and configured to carry out the method according to claim 1.

7. A vehicle which is at least partially self-driving, knowing the radius of curvature of a future position that it is preparing to adopt in a traffic lane along which it is traveling, wherein said vehicle comprises a speed regulation device according to claim 6.

8. The method according to claim 1 wherein, in said step, said maximum transverse acceleration that can be experienced by said vehicle in said curve is determined as a function of a speed interval to which said speed setpoint belongs and which is chosen from at least two chosen speed intervals.

9. The method according to claim 8, wherein, in said step, said speed intervals are chosen as a function of said current local context.

10. The method according to claim 1 further comprising electronically determining a maximum reduction speed as a function of a current local context in the traffic lane in which the vehicle is travelling; wherein a speed difference between the speed setpoint and the deceleration speed is not greater than a value equal to the maximum reduction in speed.

11. The method according to claim 10 wherein said step of determining said maximum reduction speed comprises determining a speed which will enable the vehicle to pass a second vehicle which is travelling in a neighboring lane while said vehicle is travelling along said curve.

12. A method of regulating the speed of an at least partially self-driving vehicle, knowing the radius of curvature of a future position the vehicle is preparing to adopt in a traffic lane along which the vehicle is traveling, said method comprising:
  regulating the speed of said vehicle as a function of a speed setpoint, and,
  if a radius of curvature of said future position representative of a curve is detected, imposing a phase of deceleration on said vehicle by a controller to reduce down to a chosen deceleration speed, said step of imposing a phase of deceleration on said vehicle comprising:
    electronically determining a maximum transverse acceleration that said vehicle can undergo in said curve as a function of said speed setpoint,
    then electronically determining a maximum speed that said vehicle would have in said curve if it underwent said maximum transverse acceleration in the presence of said detected radius of curvature,
    then electrically choose a deceleration speed as a function of this determined maximum speed,
  wherein the speed setpoint is chosen by a driver of the vehicle, and wherein said method includes a step of adjusting the deceleration speed based on changes to the setpoint made by the driver.

13. The method according to claim 12, wherein, said maximum transverse acceleration that can be experienced by said vehicle in said curve is determined as a function of a speed interval to which said speed setpoint belongs and which is chosen from at least two chosen speed intervals.

14. A method of regulating the speed of an at least partially self-driving vehicle, the method comprising:
  determining a radius (rc) of curvature of a future segment of road comprising a position that the vehicle is preparing to adopt in a traffic lane along which the vehicle is traveling;
  determining if the radius (rc) of curvature of the future segment of road is representative of a bend, and if so, electronically imposing a decelerating phase on the vehicle to reduce the speed of the vehicle to a deceleration speed (vd), the step of imposing the deceleration phase comprising:
    electronically determining a maximum transverse acceleration (at) that said vehicle can undergo in said curve as a function of said speed setpoint (cv) and a maximum speed reduction (rm), said maximum speed reduction being determined as a function of a current local traffic context in the lane in which the vehicle is traveling;
    electronically determining a maximum speed (vmax) that said vehicle would have in said curve if it underwent said maximum transverse acceleration in the presence of said detected radius of curvature, the maximum speed (vmax) being a function of the maximum transverse acceleration (at) and the radius of curvature (rc), such that vmax=f(at,rc);
    electronically choosing the deceleration speed (vd) as a function of this determined maximum speed (vmax);
    electronically reducing the speed of the vehicle to the deceleration speed;
    determining if the vehicle has exited the curve, and if the vehicle has exited the curve, increasing the speed of the vehicle to attain the speed setpoint.

* * * * *